(12) United States Patent
Iguchi et al.

(10) Patent No.: US 9,343,744 B2
(45) Date of Patent: May 17, 2016

(54) BINDER, CATHODE MIXTURE AND ANODE MIXTURE

(71) Applicant: DAIKIN INDUSTRIES, LTD., Osaka-shi, Osaka (JP)

(72) Inventors: Takashi Iguchi, Settsu (JP); Takahiro Kitahara, Settsu (JP); Takuji Ishikawa, Settsu (JP); Toshiki Ichisaka, Settsu (JP); Kazunobu Uchida, Settsu (JP); Tomoyuki Fukatani, Settsu (JP); Manabu Fujisawa, Settsu (JP); Kenji Ichikawa, Settsu (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 43 days.

(21) Appl. No.: 14/374,003

(22) PCT Filed: Jan. 24, 2013

(86) PCT No.: PCT/JP2013/051468
§ 371 (c)(1),
(2) Date: Jul. 23, 2014

(87) PCT Pub. No.: WO2013/111822
PCT Pub. Date: Aug. 1, 2013

(65) Prior Publication Data
US 2015/0017532 A1     Jan. 15, 2015

(30) Foreign Application Priority Data

Jan. 24, 2012  (JP) ................................. 2012-012066
Mar. 15, 2012  (JP) ................................. 2012-059149

(51) Int. Cl.
| H01M 4/62 | (2006.01) |
| C08F 214/22 | (2006.01) |
| C08F 114/22 | (2006.01) |
| C08L 27/16 | (2006.01) |
| H01M 10/0525 | (2010.01) |
| C09D 127/16 | (2006.01) |
| H01M 4/04 | (2006.01) |
| H01M 4/13 | (2010.01) |
| H01M 4/02 | (2006.01) |

(52) U.S. Cl.
CPC ............ *H01M 4/623* (2013.01); *C08F 114/22* (2013.01); *C08F 214/22* (2013.01); *C08F 214/225* (2013.01); *C08L 27/16* (2013.01); *C09D 127/16* (2013.01); *H01M 10/0525* (2013.01); *C08L 2205/025* (2013.01); *H01M 4/043* (2013.01); *H01M 4/0404* (2013.01); *H01M 4/13* (2013.01); *H01M 2004/027* (2013.01); *H01M 2004/028* (2013.01); *Y02E 60/122* (2013.01)

(58) Field of Classification Search
CPC ...... H01M 4/621; H01M 4/622; H01M 4/623
See application file for complete search history.

(56) References Cited

U.S. PATENT DOCUMENTS

| 5,037,922 A | 8/1991 | Kappler et al. | |
| 5,246,796 A | 9/1993 | Nagamine et al. | |
| 5,415,958 A | 5/1995 | Takahashi et al. | |
| 6,265,107 B1 | 7/2001 | Shimizu et al. | |
| 2004/0072072 A1* | 4/2004 | Suzuki et al. | C01G 45/1221 429/231.1 |
| 2004/0072959 A1* | 4/2004 | Grootaert et al. | C08K 5/29 525/326.3 |
| 2009/0239147 A1 | 9/2009 | Itou et al. | |
| 2009/0269672 A1* | 10/2009 | Takita et al. | B01D 67/002 429/254 |
| 2009/0274912 A1* | 11/2009 | Bonnet | B32B 1/08 428/422 |
| 2011/0256437 A1 | 10/2011 | Katsuki et al. | |

FOREIGN PATENT DOCUMENTS

| EP | 0824120 A1 * | 2/1998 |
| JP | 3-20311 A | 1/1991 |
| JP | 4249859 A | 9/1992 |
| JP | 10-233217 A | 9/1998 |
| JP | 10-302799 A | 11/1998 |
| JP | 10302799 A | 11/1998 |
| JP | 200119896 A | 1/2001 |
| JP | 2003-263987 A | 9/2003 |
| JP | 2011-192620 A | 9/2011 |
| JP | 2011192620 A | 9/2011 |
| JP | 2011-228073 A | 11/2011 |
| WO | 2007/088979 A1 | 8/2007 |

OTHER PUBLICATIONS

International Search Report for PCT/JP2013/051468 dated Apr. 16, 2013.
International Preliminary Report on Patentability dated Jul. 29, 2014 issued by The International Searching Authority in corresponding International Patent Application No. PCT/JP2013/051468.

* cited by examiner

*Primary Examiner* — Stewart Fraser
*Assistant Examiner* — Olatunji Godo
(74) *Attorney, Agent, or Firm* — Sughrue Mion, PLLC

(57) ABSTRACT

A binder, including a fluoropolymer, the fluoropolymer including a polymerization unit based on vinylidene fluoride and a polymerization unit based on a monomer having an amide group represented by —CO—NRR' (R and R' are the same as or different from each other and each represent a hydrogen atom or an alkyl group optionally having a substituent group) or an amide bond represented by —CO—NR"— (R" represents a hydrogen atom, an alkyl group optionally having a substituent group, or a phenyl group optionally having a substituent group) and having a solution viscosity of 10 to 20,000 mPa·s. Also disclosed is a positive electrode mixture and a negative electrode mixture containing the binder, a positive electrode, a negative electrode and a lithium ion secondary cell.

11 Claims, No Drawings

BINDER, CATHODE MIXTURE AND ANODE MIXTURE

CROSS REFERENCE TO RELATED APPLICATIONS

This application is a National Stage of International Application No. PCT/JP2013/051468 filed Jan. 24, 2013, claiming priority based on Japanese Patent Application No. 2012-012066 filed Jan. 24, 2012 and 2012-059149 filed Mar. 15, 2012, the contents of all of which are incorporated herein by reference in their entirety.

TECHNICAL FIELD

The present invention relates to a binder, a positive electrode mixture, and a negative electrode mixture. More specifically, the present invention relates to a binder suitable for an electrode mixture used in nonaqueous electrolyte secondary cells such as lithium ion secondary cells, and a positive electrode mixture and a negative electrode mixture prepared using the binder.

BACKGROUND ART

Nonaqueous electrolyte secondary cells such as lithium ion secondary cells are high-voltage and high-energy-density cells that have less self-discharge and a smaller memory effect and can be significantly lightened, and therefore are suitably used for compact and easy-to-carry electrical and electronic equipment such as laptop computers, mobile phones, smart phones, tablet PCs, and ultrabook (registered trademark) PCs. Moreover, such nonaqueous electrolyte secondary cells are now coming into practical use as electric power supplies for a variety of applications from vehicle power supplies for driving used in automobiles and the like to stationary large power supplies.

In order to improve the energy density of nonaqueous electrolyte secondary cells, improvement in the technique for producing electrodes is important. In the case of electrodes of lithium ion secondary cells, for example, when a carbonaceous material such as cokes and carbons is used as a negative electrode active material for production of a negative electrode, a carbonaceous material is commonly powdered and dispersed in a solvent together with a binder to prepare a negative electrode mixture. Then, the negative electrode mixture was applied to a negative electrode current collector and, after removal of the solvent by drying, rolled out to give an electrode. Carbonaceous materials simply occluding and releasing lithium ions are herein referred to as active materials. Similarly, in production of positive electrodes, for example, a lithium-containing oxide is used as a positive electrode active material. The positive electrode active material is commonly powdered and dispersed in a solvent together with a conductive agent and a binder to prepare a positive electrode mixture. The positive electrode mixture is applied to a positive electrode current collector and, after removal of the solvent by drying, rolled out to produce a positive electrode. Polyvinylidene fluoride has been conventionally often used as a binder for lithium ion secondary cells.

For example, the technique disclosed in Patent Literature 1 is as follows. A positive electrode mixture is prepared by mixing a positive electrode active material such as a lithium-containing oxide (e.g., $LiCoO_2$), a conductive agent such as graphite, and polyvinylidene fluoride. The positive electrode mixture is dispersed in N-methylpyrrolidone to give a slurry. The slurry is applied to an aluminum foil positive electrode current collector. Separately, a negative electrode mixture is prepared by mixing a negative electrode active material such as a carbonaceous material with polyvinylidene fluoride. The negative electrode mixture is dispersed in N-methylpyrrolidone to give a slurry. The slurry is applied to a copper foil negative electrode current collector. They each are dried and compression-molded by a roller pressing machine to be formed into an electrode sheet.

A Polyvinylidene fluoride resin, however, has poor adhesiveness to base materials such as metals, and the adhesion strength thereof is desired to be improved. In addition, electrode sheets containing a polyvinylidene fluoride binder are less flexible to easily cause problems of cracking thereof and removal of the electrode mixture from the electrode sheets when folded 180° in production of square cells and when rolled to a small dimension in production of cylindrical cells, resulting in a poor yield. Moreover, a polyvinylidene fluoride resin problematically has poor alkali resistance to be easily gelled under alkaline conditions.

Introduction of functional groups such as carboxy to polyvinylidene fluoride resin has been considered for improvement of the adhesiveness of the polyvinylidene fluoride resin to base materials such as metals. For example, disclosed is a polar vinylidene fluoride copolymer prepared by copolymerizing a monomer mainly containing vinylidene fluoride and a small amount of unsaturated dibasic monoester or vinylenecarbonate (see Patent Literature 2). In Examples of Patent Literature 2, a copolymer of vinylidene fluoride and a monomer having carboxy or carbonate is mentioned.

Moreover, a binder prepared using a copolymer of vinylidene fluoride and tetrafluoroethylene has been also disclosed (see Patent Literature 3). Patent Literature 3 discloses that the use of such a copolymer improves the flexibility of a prepared binder. Patent Literature 3 also discloses that the binder prepared using a copolymer of vinylidene fluoride, tetrafluoroethylene, and a monomer having carboxy and carbonate has still better adhesiveness to a current collector.

According to another disclosure, in the case of containing a copolmyer of a specific acrylamide derivative and at least one monomer selected from vinylidene fluoride, tetrafluoroethylene, chlorotrifluoroethylene, and hexafluoropropylene, such a paint or varnish is hard, stable, transparent in the absence of pigments and capable of forming a coating sufficiently adhering to metals or glass (see Patent Literature 4). The copolymer disclosed in Patent Literature 4 is used for a paint or varnish, and therefore is limited to those having a comparatively low solution viscosity.

CITATION LIST

Patent Literature

Patent Literature 1: JP-A H04-249859
Patent Literature 2: JP-A 2001-19896
Patent Literature 3: JP-A H10-233217
Patent Literature 4: JP-A H03-20311

SUMMARY OF INVENTION

Technical Problem

As mentioned above, along with the increased demand for nonaqueous electrolyte secondary cells such as lithium ion secondary cells, various binders to be used for electrodes thereof have been considered. In particular, binders excellent in adhesiveness to base materials such as metals are demanded.

Recently, reduction in size, weight, and thickness of electronic equipment has been more and more desired, resulting in a demand for higher-performance cells. For improvement in the energy density of cells, an increase in the electrode density (capacity) and voltage has been considered.

Binders hardly contributes to the electrochemical performance of cells, and therefore, the used amount thereof is preferably as small as possible for the purpose of increasing the electrode density and lowering the internal resistance of electrodes. Lithium ion secondary cells have a shape of cylinder, square, laminate, and the like. Since electrode sheets are wound and pressed to be introduced into cells, the electrode sheets are likely to be cracked and powdery electrode materials are dropped or removed from current collector base materials. This has raised a demand for binders excellent in adhesiveness and flexibility. In addition, the durability thereof under high voltage is also important.

The present invention was devised in consideration of the state of the art in the field of nonaqueous electrochemical elements such as nonaqueous (secondary) cells (especially, lithium ion cells) and electrical double layer capacitors, and aims to provide a binder, a positive electrode mixture, and a negative electrode mixture that hold powdery electrode materials well, even in a case where the used amount thereof is smaller than a conventional case, and have excellent adhesiveness to current collector base materials and flexibility that does not allow cracking of electrodes thickened for increasing the density upon winding and pressing thereof, and therefore are suitable for higher-capacity and higher-voltage cells.

Solution to Problem

The present inventors intensively studied about binders excellent in flexibility and adhesiveness to base materials to find out that a binder containing a polymerization unit based on a monomer having an amide group or an amide bond and a vinylidene fluoride copolymer having a specific solution viscosity is excellent in flexibility and adhesiveness to metallic base materials or the like, especially to carbons or metals that are used for electrode current collectors provided in nonaqueous electrolyte secondary cells such as lithium ion secondary cells and electrical double layer capacitors. If the binder is excellent in adhesiveness, the used amount thereof may be reduced. In such a case, the electrode density may be improved and the resistance of the electrodes may be reduced. The cell characteristics are thus improved. Additionally, since the used amount of the binder is reduced, the production cost can be also reduced. Moreover, in a case where the binder has excellent flexibility, the resulting electrode is not cracked on the occasion of being wound and pressed even when it is thickened for increasing the density. The present inventors found out that such a binder can be significantly favorably used for electrode mixtures used in nonaqueous electrolyte secondary cells such as lithium ion secondary cells and electrical double layer capacitors, thereby completing the present invention.

Specifically, the present invention provides a binder, including a fluoropolymer, the fluoropolymer including a polymerization unit based on vinylidene fluoride and a polymerization unit based on a monomer having an amide group represented by —CO—NRR' (R and R' are the same as or different from each other and each represent a hydrogen atom or an alkyl group optionally having a substituent group) or an amide bond represented by —CO—NR"— (R" represents a hydrogen atom, an alkyl group optionally having a substituent group, or a phenyl group optionally having a substituent group) and having a solution viscosity of 10 to 20,000 mPa·s.

The present invention also provides a positive electrode mixture including a positive electrode active material, an organic solvent, and the binder.

The present invention also provides a negative electrode mixture including a negative electrode active material, an organic solvent, and the binder.

The present invention further provides a positive electrode including a positive electrode current collector and a positive electrode active material layer formed of a positive electrode active material and the binder on the positive electrode current collector.

The present invention further provides a negative electrode including a negative electrode current collector and a negative electrode active material layer formed of a negative electrode active material and the binder on the negative electrode current collector.

The present invention still further provides a lithium ion secondary cell including the positive electrode of the present invention, a negative electrode, and a nonaqueous electrolyte.

The present invention still further provides a lithium ion secondary cell including a positive electrode, the negative electrode of the present invention, and a nonaqueous electrolyte.

The present invention is specifically described in the following.

The fluoropolymer contained in the binder of the present invention includes a polymerization unit based on vinylidene fluoride and a polymerization unit based on a monomer having an amide group represented by —CO—NRR' (R and R' are the same as or different from each other and each represent a hydrogen atom or an alkyl group optionally having a substituent group) or an amide bond represented by —CO—NR"— (R" represents a hydrogen atom, an alkyl group optionally having a substituent group, or a phenyl group optionally having a substituent group). The resulting binder is excellent in flexibility and adhesiveness to base materials. The monomer having an amide group or an amide bond has better oxidation resistance than a monomer having another functional group, and is favorably used in higher-voltage cells.

The monomer having an amide group or an amide bond is not particularly limited as long as it has at least one polymerizable carbon-carbon double bond and at least one amide group or amide bond in a molecule. One or two or more monomers having an amide group or an amide bond may be used.

The fluoropolymer has a solution viscosity of 10 to 20,000 mPa·s. The resulting binder has further better adhesiveness to base materials. The solution viscosity is the solution viscosity of a 5% by mass solution of the fluoropolymer in N-methyl-2-pyrrolidone at 25° C.

The solution viscosity is preferably 20 to 10,000 mPa·s, more preferably 30 to 7,000 mPa·s, still more preferably 40 to 6,000 mPa·s, even more preferably 80 to 5,000 mPa·s, particularly preferably 100 to 3,000 mPa·s, and most preferably 150 to 1,500 mPa·s.

In the fluoropolymer, the amount of the polymerization unit based on the monomer having an amide group or an amide bond is preferably 0.01 to 3 mol % relative to the amount of all the polymerization units. When the amount of the polymerization unit based on the monomer having an amide group or an amide bond is within the above range, the adhesiveness of the resulting binder to base materials can be improved without lowering the properties derived from vinylidene fluoride. The amount of the polymerization unit based on the monomer having an amide group or an amide bond is more preferably 0.01 to 2.5 mol %, and still more preferably 0.04 to 2 mol %.

Provided that the fluoropolymer has a polymerization unit based on vinylidene fluoride and a polymerization unit based on the monomer having an amide group or an amide bond, it may further have polymerization unit(s) based on other monomer(s) copolymerizable with the above monomers.

The other monomer(s) are particularly preferably tetrafluoroethylene. In other words, the fluoropolymer preferably further has a polymerization unit based on tetrafluoroethylene. The resulting binder has excellent flexibility. Additionally, the chemical resistance (especially, alkali resistance) is also improved.

In a case where the fluoropolymer has a polymerization unit based on tetrafluoroethylene, the amount of the polymerization unit based on vinylidene fluoride is preferably 50 to 90 mol % and the amount of the polymerization unit based on tetrafluoroethylene is preferably 9.9 to 49.9 mol % relative to the amount of all the polymerization units. In such a case, the flexibility and chemical resistance of the resulting binder are improved, without damage to the properties derived from other polymerization units. More preferably, the amount of the polymerization unit based on vinylidene fluoride is 55 to 80 mol % and the amount of the polymerization unit based on tetrafluoroethylene is 19.9 to 44.9 mol %. Still more preferably, the amount of the polymerization unit based on vinylidene fluoride is 60 to 75 mol % and the amount of the polymerization unit based on tetrafluoroethylene is 24.9 to 39.9 mol %.

In terms of stabilization of the viscosity of the electrode mixture, the amount of the polymerization unit based on vinylidene fluoride is more preferably 55 to 89.5 mol % and the amount of the polymerization unit based on tetrafluoroethylene is 10.4 to 44.9 mol %. Still more preferably, the amount of the polymerization unit based on vinylidene fluoride is 60.0 to 89.0 mol % and the amount of the polymerization unit based on tetrafluoroethylene is 10.9 to 39.9 mol %.

Examples of the monomer for forming the fluoropolymer include, in addition to the above-mentioned ones, vinyl fluoride, trifluoroethylene, trifluorochloroethylene, fluoroalkyl vinyl ether, hexafluoropropylene, 2,3,3,3-tetrafluoropropene, and propylene. Among these, particularly preferred are hexafluoropropylene and 2,3,3,3-tetrafluoropropene from the standpoint of flexibility and chemical resistance.

In the case of using such a monomer, the amount of the polymerization unit based on the monomer is preferably 0.1 to 50 mol % relative to the amount of all the polymerization units.

In the following, the present invention is described in more detail with reference to specific examples.

In the monomer having an amide group, the amide group is represented by —CO—NRR'. In the formula, R and R' each represent a hydrogen atom or an alkyl group. R and R' may be the same as or different from each other.

The alkyl group may or may not have a substituent group. The alkyl group may have a chain, cyclic, or branched structure. The alkyl group preferably has a carbon number of 1 to 30. The carbon number is more preferably 1 to 20.

Examples of the substituent group include halogen atoms, C1-C30 alkoxy groups, and C6-C30 aryl groups.

As mentioned above, the monomer having an amide group is not particularly limited as long as it has at least one polymerizable carbon-carbon double bond and at least one amide group in a molecule, and is preferably a monomer having one polymerizable carbon-carbon double bond and one amide group in a molecule represented by Formula (1):

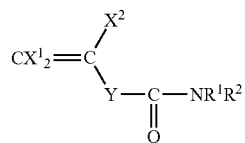

wherein $X^1$s may be the same as or different from each other and each represent a hydrogen atom or an alkyl group optionally having a substituent group, $X^2$ represents a hydrogen atom or an alkyl group optionally having a substituent group, Y represents a single bond or an alkylene group optionally having a substituent group, $R^1$ and $R^2$ may be the same as or different from each other and each represent a hydrogen atom or an alkyl group optionally having a substituent group.

$X^1$s in Formula (1) each represent a hydrogen atom or an alkyl group. Two $X^1$s in Formula (1) may be the same as or different from each other.

The alkyl group may or may not have a substituent group. The alkyl group may have a chain, cyclic, or branched structure. Examples of the alkyl group are the same groups as those mentioned for R and R'.

X' is preferably a hydrogen atom or a halogen atom, and is particularly preferably a hydrogen atom.

$X^2$ in Formula (1) represents a hydrogen atom or an alkyl group. The alkyl group may or may not have a substituent group. The alkyl group may have a chain, cyclic, or branched structure. Examples of the alkyl group are the same groups as those mentioned for X'. In particular, $X^2$ is preferably a hydrogen atom or a methyl group.

Y in Formula (1) represents a single bond or an alkylene group. The alkylene group may or may not have a substituent group. The alkylene group may have a chain, cyclic, or branched structure. The alkylene group preferably has a carbon number of 1 to 30. The carbon number is more preferably 1 to 25.

Examples of the substituent group are the same as those mentioned for X'.

$R^1$ and $R^2$ in Formula (1) each represent a hydrogen atom or an alkyl group. $R^1$ and $R^2$ may be the same as or different from each other. The alkyl group may or may not have a substituent group. The alkyl group may have a chain, cyclic, or branched structure. Examples of the alkyl group are the same groups as those mentioned for X'. In particular, $R^1$ and $R^2$ each are preferably a hydrogen atom or a halogen atom, and particularly preferably a hydrogen atom.

The monomer having an amide group is preferably a (meth)acrylamide represented by Formula (2):

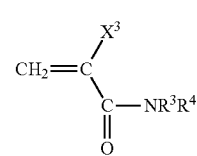

wherein $X^3$ represents a hydrogen atom or a methyl group, $R^3$ and $R^4$ may be the same as or different from each other and each represent a hydrogen atom or an alkyl group optionally having a substituent group. Specific examples of $R^3$ and $R^4$ in Formula (2) are the same as those mentioned for $R^1$ and $R^2$ in Formula (1).

Examples of the (meth)acrylamide include (meth)acrylamide and its derivatives. Specific examples thereof include (meth)acrylamide, N-methyl(meth)acrylamide, N-isopropyl (meth)acrylamide, N-tert-butyl(meth)acrylamide, N-phenyl (meth)acrylamide, N-methoxymethyl(meth)acrylamide, N-butoxymethyl(meth)acrylamide, 4-acroylmorpholine, diacetone(meth)acrylamide, N,N-dimethyl(meth)acrylamide, N,N-diethyl(meth)acrylamide, and 2-(meth)acrylamide-2-methylpropanesulfonate. Among these, particularly preferred is N-tert-butylacrylamide.

In the monomer having an amide bond, the amide bond is represented by —CO—NR"—, and may also be represented by —CO—NR"—CO—. R" represents a hydrogen atom, an alkyl group optionally having a substituent group, or a phenyl group optionally having a substituent group. Examples of the alkyl group and substituent group may be the same groups as those mentioned for R representing the alkyl groups and substituent groups in the monomer having an amide group. Examples of the monomer having an amide bond include N-vinylacetamide derivatives such as N-vinylacetamide and N-methyl-N-vinylacetamide, and maleimide derivatives such as maleimide, N-butylmaleimide, and N-phenylmaleimide. Among these, particularly preferred is N-vinylacetamide.

The fluoropolymer has a weight average molecular weight (in terms of polystyrene) of preferably 50000 to 2000000. The weight average molecular weight is more preferably 80000 to 1700000, and still more preferably 100000 to 1500000.

In terms of improvement in the cell characteristics, the weight average molecular weight is more preferably 80000 to 1950000, and still more preferably 100000 to 1900000.

The weight average molecular weight can be measured by gel permeation chromatography (GPC) using N,N-dimethylformamide as a solvent at 50° C.

In terms of improvement in the cell characteristics, the fluoropolymer preferably has a number average molecular weight (in terms of polystyrene) of 16000 to 1300000. The number average molecular weight is more preferably 20000 to 1200000.

The number average molecular weight can be measured by gel permeation chromatography (GPC) using N,N-dimethylformamide as a solvent at 50° C.

Copolymerization of vinylidene fluoride, the monomer having an amide group or an amide bond, and optional other monomer(s) copolymerizable with these monomers may be conducted by suspension polymerization, emulsion polymerization, solution polymerization, or the like. In terms of easy post-treatment, preferred are aqueous polymerization methods such as suspension polymerization and emulsion polymerization.

In the copolymerization, a polymerization initiator, a surfactant, a chain transfer agent, and a solvent may be used, and these each may be a conventionally known one. The polymerization initiator may be an oil-soluble radical polymerization initiator or a water-soluble radical polymerization initiator.

Examples of the oil-soluble radical polymerization initiator include known oil-soluble peroxides. Typical examples thereof include: dialkyl peroxycarbonates such as diisopropyl peroxydicarbonate, di-n-propyl peroxydicarbonate, and di-sec-butyl peroxydicarbonate; peroxyesters such as t-butyl peroxyisobutyrate and t-butyl peroxypivalate; dialkylperoxides such as di-t-butylperoxide; and di[perfluoro (or fluorochloro) acyl]peroxides such as di(ω-hydro-dodecafluoroheptanoyl)peroxide, di(ω-hydro-tetradecafluoro heptanoyl) peroxide, di(ω-hydro-hexadecafluoro nonanoyl)peroxide, di(perfluorobutyryl)peroxide, di(perfluoropaleryl)peroxide, di(perfluorohexanoyl)peroxide, di(perfluoroheptanoyl)peroxide, di(perfluoroocatnoyl)peroxide, di(perfluorononanoyl) peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, co-chloro-hexafluorobutyryl-ω-chlodecafluorohexanoyl-peroxide, ω-hydrododecafluoroheptanoyl-perfluoro butyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl) peroxide, and di(undecachlorodotriacontafluorodocosanoyl) peroxide.

The water-soluble radical polymerization initiator may be a known water-soluble peroxide, and examples thereof include: ammonium, potassium, and sodium salts of persulfate, perborate, perchlorate, perphosphate, and percarbonate; t-butyl permaleate; and t-butyl hydroperoxide. These peroxides may be used in combination with a reducing agent such as sulfites and sulfite salts. In this case, the amount of the reducing agent is 0.1 to 20 times greater than the amount of the peroxide.

As the surfactant, a known surfactant may be used. Specific examples thereof include nonionic surfactants, anionic surfactants, and cationic surfactants. Among these, preferred is an anionic fluorosurfactant. More preferred is a linear or branched C4-C20 anionic fluorosurfactant which optionally contains an ether bond (i.e., an oxygen atom between carbon atoms). The amount of the surfactant (based on water as a polymerization medium) is preferably 50 to 5000 ppm.

Examples of the chain transfer agent include hydrocarbons such as ethane, isopentane, n-hexane and cyclohexane; aromatic compounds such as toluene and xylene; ketones such as acetone; acetic acid esters such as ethyl acetate and butyl acetate; alcohols such as methanol and ethanol; mercaptanes such as methyl mercaptane; and halogenated hydrocarbons such as carbon tetrachloride, chloroform, methylene chloride, and methyl chloride. The amount of the chain transfer agent depends on the chain transfer constant thereof and is commonly 0.01 to 20% by mass relative to the amount of the polymerization solvent.

Examples of the solvent include water and a mixed solvent of water and an alcohol.

In the case of suspension polymerization, a fluorine solvent may be used in combination with water. Examples of the fluorine solvent include hydrochlorofluoroalkanes such as $CH_3CClF_2$, $CH_3CCl_2F$, $CF_3CF_2CCl_2H$, and $CF_2ClCF_2CFHCl$; chlorofluoro alkanes such as $CF_2ClCFClCF_2CF_3$ and $CF_3CFClCFClCF_3$; and perfluoroalkanes such as perfluorocyclobutane, $CF_3CF_2CF_2CF_3$, $CF_3CF_2CF_2CF_2CF_3$, and $CF_3CF_2CF_2CF_2CF_2CF_3$. Among these, preferred are perfluoro alkanes. For easy suspension and cost saving, the amount of the fluorine solvent is preferably 10 to 100% by mass relative to the amount of an aqueous medium.

The polymerization temperature is not particularly limited, and may be 0° C. to 100° C. The polymerization pressure is appropriately determined in consideration of the type and amount of a solvent used, vapor pressure, polymerization temperature and other polymerization conditions, and may be typically 0 to 9.8 MPaG.

In the case of suspension polymerization in which water is used as a dispersion medium and a fluorine solvent is not used, a suspending agent such as methyl cellulose, methoxylated methyl cellulose, propoxylated methyl cellulose, hydroxy ethyl cellulose, hydroxy propyl cellulose, polyvinyl alcohol, polyethylene oxide, and gelatin is added in an amount of 0.005 to 1.0% by mass, preferably 0.01 to 0.4% by mass relative to the amount of water.

In this case, a polymerization initiator may be diisopropyl peroxydicarbonate, di-n-propyl peroxydicarbonate, di-n-heptafluoropropyl peroxydicarbonate, isobutyrylperoxide, di(chlorofluoroacyl)peroxide, di(perfluoroacyl)peroxide, or the like. The amount thereof is preferably 0.1 to 5% by mass relative to the total amount of monomers (total amount of vinylidene fluoride, the monomer having an amide group or an amide bond, and optional other monomer(s) copolymerizable with these monomers).

The polymerization degree of resulting polymers can be adjusted by adding a chain transfer agent such as ethyl acetate, methyl acetate, acetone, ethanol, n-propanol, acetaldehyde, propylaldehyde, ethyl propionate, and carbon tetrachloride. The amount thereof is commonly 0.1 to 5% by mass, preferably 0.5 to 3% by mass relative to the total amount of polymers.

In terms of the total feed amount of the monomers, the ratio of (total amount of monomers):(water) is 1:1 to 1:10, preferably 1:2 to 1:5 (in weight). Polymerization is carried out at a temperature of 10° C. to 50° C. for 10 to 100 hours.

The above suspension polymerization enables easy copolymerization of vinylidene fluoride, the monomer having an amide group or an amide bond, and other optional monomer(s).

The feed amount of the monomers copolymerized with vinylidene fluoride (i.e., the monomer having an amide group or an amide bond, and optional other monomer(s)) is determined in consideration of the adhesiveness, chemical resistance, molecular weight, polymerization yield, and the like of resulting copolymers.

The resulting fluoropolymer well adheres to base materials such as metals, and therefore is suitable for a binder used for electrodes of nonaqueous electrolyte secondary cells and the like. The binder of the present invention may contain other component(s) as long as it contains the fluoropolymer. One or two or more kinds of other components may be used.

Examples of the other component(s) usable in the binder include vinylidene fluoride (VdF) polymers, polymethacrylate, polymethyl methacrylate, polyacrylonitrile, polyimide, polyamide, polyamide imide, polycarbonate, styrene rubber, and butadiene rubber. Among these, particularly preferred is VdF polymers.

The amount of these other component(s) is preferably 10 to 900% by mass relative to the amount of the fluoropolymer.

Examples of the VdF polymers include polyvinylidene fluoride (PVdF), VdF/tetrafluoroethylene (TFE) copolymers, VdF/hexafluoropropylene (HFP) copolymers, and VdF/chlorotrifluoroethylene (CTFE) copolymers.

The VdF polymers preferably have a weight average molecular weight (in terms of polystyrene) of 50000 to 2000000. The weight average molecular weight is more preferably 80000 to 1700000, and still more preferably 100000 to 1500000.

The weight average molecular weight can be measured by gel permeation chromatography (GPC) using N,N-dimethylformamide as a solvent at 50° C.

The VdF polymers preferably have a number average molecular weight (in terms of polystyrene) of 35000 to 1400000. The number average molecular weight is more preferably 40000 to 1300000, and still more preferably 50000 to 1200000.

The number average molecular weight can be measured by gel permeation chromatography (GPC) using N,N-dimethylformamide as a solvent at 50° C.

The PVdF may be a homopolymer including only a VdF-based polymerization unit (VdF unit) or a polymer including a VdF-based polymerization unit and a polymerization unit based on a monomer ($\alpha$) copolymerizable with VdF.

Examples of the monomer ($\alpha$) include tetrafluoroethylene, vinyl fluoride, trifluoroethylene, trifluorochloro ethylene, fluoroalkyl vinyl ether, hexafluoropropylene, 2,3,3,3-tetrafluoropropene, and propylene. The examples further include unsaturated dibasic acid monoesters as disclosed in JP-A H06-172452, such as monomethyl maleate, monomethyl citraconate, monoethyl citraconate, and vinylenecarbonate; and compounds having a hydrophilic polar group such as $-SO_3M$, $-OSO_3M$, $-COOM$, (M indicating alkali metal) and amine polar group (e.g., $-NHR^5$ and $-NR^6R^7$ ($R^5$, $R^6$, $R^7$ each representing alkyl group)) as disclosed in JP-A H07-201316, such as $CH_2=CH-CH_2-A$, $CH_2=C(CH_3)-CH_2-A$, $CH_2=CH-CH_2-O-CO-CH(CH_2COOR^8)-A$, $CH_2=CH-CH_2-O-CH_2-CH(OH)-CH_2-A$, $CH_2=C(CH_3)-CO-O-CH_2-CH_2-CH_2-A$, $CH_2=CH-CO-O-CH_2-CH_2-A$, $CH_2=CHCO-NH-C(CH_3)_2-CH_2-A$ (A representing a hydrophilic polar group and $R^8$ representing alkyl group); maleic acid; and maleic anhydride. Moreover, also usable as copolymerizable monomers are hydrated allyl ether monomers such as $CH_2=CH-CH_2-O-(CH_2)_n-OH$ ($3 \le n \le 8$),

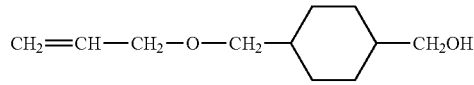

$CH_2=CH-CH_2-O-(CH_2-CH_2-O)_n-H$ ($1 \le n \le 14$), and $CH_2=CH-CH_2-O-(CH_2-CH(CH_3)-O)_n-H$ ($1 \le n \le 14$); and allyl ether/ester monomers that are carboxylated and/or substituted with $-(CF_2)_n-CF_3$ ($3 \le n \le 8$), such as $CH_2=CH-CH_2-O-CO-C_2H_4-COOH$, $CH_2=CH-CH_2-O-CO-C_5H_{10}-COOH$, $CH_2=CH-CH_2-O-C_2H_4-(CF_2)_nCF_3$, $CH_2=CH-CH_2-CO-O-C_2H_4-(CF_2)_nCF_3$, and $CH_2=C(CH_3)-CO-O-CH_2-CF_3$. Based on previous studies, even in the case of compounds other than the above compounds having a polar group and the like, slight reduction in crystallizability of the fluoropolymer imparts flexibility to materials, presumably providing the compounds with better adhesiveness to a current collector made of a metal foil such as aluminum and copper foils. Accordingly, also usable are unsaturated hydrocarbon monomers ($CH_2=CHR$, R representing a hydrogen atom, alkyl group or halogen such as Cl) such as ethylene and propylene, and fluorine monomers such as chlorotrifluoroethylene, hexafluoropropylene, hexafluoroisobutene, $CF_2=CF-O-C_nF_{2n+1}$ (n representing an integer of at least 1), $CH_2=CF-C_nF_{2n+1}$ (n representing an integer of at least 1), $CH_2=CF-(CF_2CF_2)_nH$ (n representing an integer of at least 1), and $CF_2=CF-O-(CF_2CF(CF_3)O)_m-C_nF_{2n+1}$ (m and n each representing an integer of at least 1).

Moreover, also usable are fluoroethylene monomers having at least one functional group represented by the following formula:

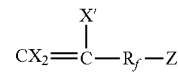

wherein Z represents $-CH_2OH$, $-COOH$, a carboxylate salt, a carboxy ester group, or an epoxy group, X and X' are the same as or different from each other and each represent a hydrogen or fluorine atom, and $R_f$ represent a C1-C40 divalent fluoroalkylene group or a C1-C40 divalent fluoroalkylene group including an ether bond. Copolymerization of one or two or more kinds of these monomers further improves the adhesiveness to a current collector. In such a case, the electrode active material is not removed from the current collector even after repetitive charge and discharge, leading to favorable charge/discharge cycling characteristics.

In the PVdF, the amount of the polymerization unit based on the monomer (a) is preferably at most 5 mol %, more preferably at most 4.5 mol %, still more preferably less than 4 mol %, and even more preferably less than 3 mol % relative to the amount of all the polymerization units.

The PVdF preferably has a weight average molecular weight (in terms of polystyrene) of 50000 to 2000000. The weight average molecular weight is more preferably 80000 to 1700000, and still more preferably 100000 to 1500000.

The weight average molecular weight can be measured by gel permeation chromatography (GPC) using N,N-dimethylformamide as a solvent at a temperature of 50° C.

The PVdF preferably has a number average molecular weight (in terms of polystyrene) of 35000 to 1400000.

If the number average molecular weight is less than 35000, the resulting electrode has poor adhesiveness. If the number average molecular weight is more than 1400000, gelation may be easily caused during preparation of an electrode mixture.

The number average molecular weight is preferably at least 40000, more preferably at least 50000, and still more preferably at least 60000, and preferably at most 1300000, and more preferably at most 1200000.

The number average molecular weight can be measured by gel permeation chromatography (GPC) using N,N-dimethylformamide as a solvent at 50° C.

The PVdF may be produced by a conventionally known method. In an exemplary method, VDF and the monomer (a) each forming a polymerization unit, and additives such as polymerization initiators are appropriately mixed, and solution polymerization or suspension polymerization are conducted.

The VdF/TFE copolymer is a copolymer including a VdF-based polymerization unit (VdF unit) and a TFE-based polymerization unit (TFE unit).

The VdF/TFE copolymer preferably contains the VdF unit in an amount of 50 to 95 mol % relative to the amount of all the polymerization units. If the amount of the VdF unit is less than 50 mol %, the viscosity of the obtained electrode mixture has a greater change with time. If the amount is more than 95 mol %, the flexibility of the electrode produced using the resulting mixture tends to be poor.

The VdF/TFE copolymer contains the VdF unit in an amount of preferably at least 55 mol % and more preferably at least 60 mol % relative to the amount of all the polymerization units. The VdF/TFE copolymer contains the VdF unit in an amount of more preferably at most 92 mol % and still more preferably at most 89 mol % relative to the amount of all the polymerization units.

The VdF/TFE copolymer composition can be determined using a NMR analyzer.

The VdF/TFE copolymer may contain, in addition to the VdF unit and TFE unit, a polymerization unit based on a monomer copolymerizable with VdF and TFE. To achieve the effects of the present invention, a copolymer of VdF and TFE will work. The adhesiveness can be further improved by copolymerization with a monomer that is copolymerizable with VdF and TFE to the degree that would not impair the excellent swelling resistance of the copolymer with electrolytes.

The amount of the polymerization unit based on the monomer that is copolymerizable with VdF and TFE is preferably less than 3.0 mol % relative to the amount of all the polymerization units in the VdF/TFE copolymer. If the amount is more than 3.0 mol %, commonly, the copolymer of VdF and TFE has significantly lowered crystallizability, leading to reduction in the swelling resistance with electrolytes.

Examples of the monomer that is copolymerizable with VdF and TFE include unsaturated dibasic acid monoesters as disclosed in JP-A H06-172452, such as monomethyl maleate, monomethyl citraconate, monoethyl citraconate, and vinylenecarbonate; and compounds having a hydrophilic polar group such as $-SO_3M$, $-OSO_3M$, $-COOM$, $-OPO_3M$ (M indicating alkali metal) and amine polar group (e.g., $-NHR^5$ and $-NR^6R^7$ ($R^5$, $R^6$, $R^7$ each representing alkyl group)) as disclosed in JP-A H07-201316, such as $CH_2=CH-CH_2-A$, $CH_2=C(CH_3)-CH_2-A$, $CH_2=CH-CH_2-O-CO-CH(CH_2COOR^8)-A$, $CH_2=CH-CH_2-O-CH_2-CH(OH)-CH_2-A$, $CH_2=C(CH_3)-CO-O-CH_2-CH_2-CH_2-A$, $CH_2=CH-CO-O-CH_2-CH_2-A$, $CH_2=CHCO-NH-C(CH_3)_2-CH_2-A$ (A representing a hydrophilic polar group and $R^8$ representing alkyl group); maleic acid; and maleic anhydride. Moreover, also usable as copolymerizable monomers are hydrated allyl ether monomers such as $CH_2=CH-CH_2-O-(CH_2)_n-OH$ ($3 \leq n \leq 8$),

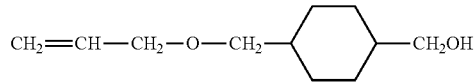

$CH_2=CH-CH_2-O-(CH_2-CH_2-O)_n-H$ ($1 \leq n \leq 14$), and $CH_2=CH-CH_2-O-(CH_2-CH(CH_3)-O)_n-H$ ($1 \leq n \leq 14$); and allyl ether/ester monomers that are carboxylated and/or substituted with $(CF_2)_n-CF_3$ ($3 \leq n \leq 8$), such as $CH_2=CH-CH_2-O-CO-C_2H_4-COOH$, $CH_2=CH-CH_2-O-CO-O_5H_{10}-COOH$, $CH_2=CH-CH_2-O-C_2H_4-(CF_2)_nCF_3$, $CH_2=CH-CH_2-CO-O-C_2H_4-(CF_2)_nCF_3$, and $CH_2=C(CH_3)-CO-O-CH_2-CF_3$.

Based on previous studies, even in the case of compounds other than the above compounds having a polar group and the like, slight reduction in crystallizability of the fluoropolymer imparts flexibility to materials, presumably providing the compounds with better adhesiveness to a current collector made of a metal foil such as aluminum and copper foils. Accordingly, also usable are unsaturated hydrocarbon monomers ($CH_2=CHR$, R representing hydrogen atom, alkyl group, or halogen such as Cl) such as ethylene and propylene, and fluorine monomers such as chlorotrifluoroethylene, hexafluoropropylene, hexafluoroisobutene, 2,3,3,3-tetrafluoropropene, $CF_2=CF-O-C_nF_{2n+1}$ (n representing an integer of at least 1), $CH_2=CF-C_nF_{2n+1}$ (n representing an integer of at least 1), $CH_2=CF-(CF_2CF_2)_nH$ (n representing an integer of at least 1), and $CF_2=CF-O-(CF_2CF(CF_3)O)_m-C_nF_{2n+1}$ (m and n each representing an integer of at least 1).

Moreover, also usable are fluoroethylene monomers having at least one functional group represented by the following formula:

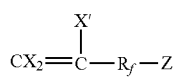

wherein Z represents —CH$_2$OH, —COOH, a carboxylate salt, a carboxy ester group, or an epoxy group, X and X' are the same as or different from each other and each represent a hydrogen or fluorine atom, and R$_f$ represent a C1-C40 divalent fluoroalkylene group or a C1-C40 divalent fluoroalkylene group including an ether bond. Copolymerization of one or two or more kinds of these monomers further improves the adhesiveness to a current collector. In such a case, the electrode active material is not removed from the current collector even after repetitive charge and discharge, leading to favorable charge/discharge cycling characteristics.

Among these monomers, from the standpoint of flexibility and chemical resistance, particularly preferred are hexafluoropropylene and 2,3,3,3-tetrafluoropropene.

Accordingly, the VdF/TFE copolymer may contain, in addition to the VdF unit and TFE unit, other polymerization unit(s) but preferably contain only the VdF unit and the TFE unit.

The VdF/TFE copolymer preferably has a weight average molecular weight (in terms of polystyrene) of 50000 to 2000000. The weight average molecular weight is more preferably 80000 to 1700000, and still more preferably 100000 to 1500000.

The weight average molecular weight can be measured by gel permeation chromatography (GPC) using N,N-dimethylformamide as a solvent at a temperature of 50° C.

The VdF/TFE copolymer preferably has a number average molecular weight (in terms of polystyrene) of 35000 to 1400000. The number average molecular weight is more preferably 40000 to 1300000, and still more preferably 50000 to 1200000.

The number average molecular weight can be measured by gel permeation chromatography (GPC) using N,N-dimethylformamide as a solvent at a temperature of 50° C.

The VdF/TFE copolymer may be produced by, for example, appropriately mixing monomers for forming polymerization units, such as VdF and TFE, and additives such as polymerization initiators, and then conducting suspension polymerization, emulsion polymerization, solution polymerization, or the like. In terms of easy post-treatment, preferred are aqueous polymerization methods such as suspension polymerization and emulsion polymerization.

Usable additives in the above polymerization are polymerization initiators, surfactants, chain transfer agents, and solvents. These additives may be conventionally known additives.

The VdF/HFP copolymer is a copolymer including a VdF-based polymerization unit (VdF unit) and a HFP-based polymerization unit (HFP unit).

The VdF/HFP copolymer preferably contains the VdF unit in an amount of 80 to 98 mol % relative to the amount of all the polymerization units. If the amount of the VdF unit is less than 80 mol %, the resulting electrode tends to swell much with electrolytes to significantly lower the cell characteristics. If the amount is more than 98 mol %, the flexibility of the electrode produced using the resulting mixture tends to be poor.

The VdF/HFP copolymer contains the VdF unit in an amount of preferably at least 83 mol % and more preferably at least 85 mol % relative to the amount of all the polymerization units. The VdF/HFP copolymer contains the VdF unit in an amount of more preferably at most 97 mol % and still more preferably at most 96 mol % relative to the amount of all the polymerization units.

The VdF/HFP copolymer composition can be determined using a NMR analyzer.

The VdF/HFP copolymer may contain, in addition to the VdF unit and HFP unit, a polymerization unit based on a monomer copolymerizable with VdF and HFP. To achieve the effects of the present invention, a copolymer of VdF and HFP will work. The adhesiveness can be further improved by copolymerization with a monomer that is copolymerizable with VdF and HFP to the degree that would not impair the excellent swelling resistance of the copolymer with electrolytes.

The amount of the polymerization unit based on the monomer copolymerizable with VdF and HFP is preferably less than 3.0 mol % relative to the amount of all the polymerization units in the VdF/HFP copolymer. If the amount is 3.0 mol % or more, the copolymer of VdF and HFP generally has significantly lowered crystallizability, leading to reduction in the swelling resistance with electrolytes.

Examples of the monomer that is copolymerizable with VdF and HFP include the same monomers as those mentioned for the monomer that is copolmyerizable with VdF and TFE in the description given on the VdF/TFE copolymer.

The VdF/HFP copolymer has a weight average molecular weight (in terms of polystyrene) of 50000 to 2000000. The weight average molecular weight is more preferably 80000 to 1700000, and still more preferably 100000 to 1500000.

The weight average molecular weight can be measured by gel permeation chromatography (GPC) using N,N-dimethylformamide as a solvent at 50° C.

The VdF/HFP copolymer preferably has a number average molecular weight (in terms of polystyrene) of 35000 to 1400000. The number average molecular weight is more preferably 40000 to 1300000, and still more preferably 50000 to 1200000.

The number average molecular weight can be measured by gel permeation chromatography (GPC) using N,N-dimethylformamide as a solvent at 50° C.

The VdF/HFP copolymer may be produced by, for example, appropriately mixing monomers for forming polymerization units, such as VdF and HFP, and additives such as polymerization initiators, and then conducting suspension polymerization, emulsion polymerization, solution polymerization, or the like. In terms of easy post-treatment, preferred are aqueous polymerization methods such as suspension polymerization and emulsion polymerization.

Usable additives in the above polymerization are polymerization initiators, surfactants, chain transfer agents, and solvents. These additives may be conventionally known additives.

The VdF/CTFE copolymer is a copolymer including a VdF-based polymerization unit (VdF unit) and a CTFE-based polymerization unit (CTFE unit).

The VdF/CTFE copolymer preferably contains the VdF unit in an amount of 80 to 98 mol % relative to the amount of all the polymerization units. If the amount of the VdF unit is less than 80 mol % or more than 98 mol %, the viscosity of the obtained electrode mixture has a greater change with time. The VdF/CTFE copolymer more preferably contains the VdF unit in an amount of at most 97.5 mol % and still more preferably at most 97 mol % relative to the amount of all the polymerization units.

The VdF/CTFE copolymer preferably contains the VdF unit in an amount of at least 85 mol % and more preferably at least 90 mol % relative to the amount of all the polymerization units.

The VdF/CTFE copolymer composition can be determined using a NMR analyzer.

The VdF/CTFE copolymer may contain, in addition to the VdF unit and CTFE unit, a polymerization unit based on a monomer that is copolymerizable with VdF and CTFE. To achieve the effects of the present invention, a copolymer of VdF and CTFE will work. The adhesiveness can be further improved by copolymerization with a monomer that is copolymerizable with VdF and CTFE to the degree that would not impair the excellent swelling resistance of the copolymer with electrolytes.

The amount of the polymerization unit based on a monomer that is copolymerizable with VdF and CTFE is preferably less than 3.0 mol % relative to the amount of all the polymerization units of the VdF/CTFE copolymer. If the amount is 3.0 mol % or more, the copolymer of VdF and CTFE generally has significantly lowered crystallizability, leading to reduction in the swelling resistance with electrolytes.

Examples of the monomer that is copolymerizable with VdF and CTFE include TFE, HFP, and the same monomers as those mentioned for the monomer that is copolmyerizable with VdF and TFE in the description given on the VdF/TFE copolymer.

The VdF/CTFE copolymer has a weight average molecular weight (in terms of polystyrene) of 50000 to 2000000. The weight average molecular weight is more preferably 80000 to 1700000, and still more preferably 100000 to 1500000.

The weight average molecular weight can be measured by gel permeation chromatography (GPC) using N,N-dimethylformamide as a solvent at 50° C.

The VdF/CTFE copolymer has a number average molecular weight (in terms of polystyrene) of 35000 to 1400000. The number average molecular weight is more preferably 40000 to 1300000, and still more preferably 50000 to 1200000.

The number average molecular weight can be measured by gel permeation chromatography (GPC) using N,N-dimethylformamide as a solvent at 50° C.

The VdF/CTFE copolymer may be produced by, for example, appropriately mixing monomers for forming polymerization units, such as VdF and CTFE, and additives such as polymerization initiators, and then conducting suspension polymerization, emulsion polymerization, solution polymerization, or the like. In terms of easy post-treatment, preferred are aqueous polymerization methods such as suspension polymerization and emulsion polymerization.

Usable additives in the above polymerization are polymerization initiators, surfactants, chain transfer agents, and solvents. These additives may be conventionally known additives.

Among the above mentioned polymers, the VdF polymer is preferably PVdF and a VdF/TFE copolymer, and is more preferably PVdF.

The mass ratio of (fluoropolymer)/(VdF polymer) is preferably 90/10 to 10/90, more preferably 80/20 to 15/87, and still more preferably 75/25 to 15/85.

The binder of the present invention can be contained in an electrode mixture together with an active material and an organic solvent. A nonaqueous electrolyte secondary cell that is an application target of the binder of the present invention includes a positive electrode formed of a positive electrode mixture held on a positive electrode current collector, a negative electrode formed of a negative electrode mixture held on a negative electrode current collector, and a nonaqueous electrolyte.

The following will discuss an example of a mixture for producing electrodes in cells which are prepared using the binder of the present invention.

In nonaqueous electrolyte cells in which an organic or nonaqueous electrolyte is used as an electrolyte, such as lithium ion secondary cells, the heavy-duty performance is poor due to a small conductivity of the nonaqueous electrolyte. Thus, an active material layer is thinned to increase the electrode area with an aim of improving the heavy-duty performance.

To achieve that aim, the following method has been tried. That is, a composition for forming an electrode mixture containing finely powdered active material, a conductive agent such as carbon, and a binder is directly applied to a current collector formed of a metal foil or metal mesh containing iron, stainless steel, copper, aluminum, nickel, titanium, or the like, to produce an electrode. The amount of the binder needs to be as small as possible. Accordingly, the binder is demanded to well hold an active material and have excellent adhesiveness to a current collector even in the case of being used in a small amount. Additionally, since the binder is commonly an electrically insulative material, an increase in the used amount thereof increases the internal resistance of cells. Also from this standpoint, the binder is required to fulfill its functions in the smallest possible amount.

The amount of the binder is commonly extremely small, and is preferably at most 30% by mass relative to the entire amount of the electrode mixture. The binder in such a small amount cannot completely fill voids between fine particles of the electrode mixture or between fine particle components and the current collector. In the case of a coating composition or lining material containing filler such as pigments, the filler is held with no difficulties because the amount of a binder is large enough to completely fill voids among fillers. In the case of a binder for electrodes, however, the used amount is very small as mentioned above, so that the binder is required to well hold active materials and be excellent in adhesiveness to current collectors even in a small amount.

The present invention also provides a positive electrode mixture including a positive electrode active material, an organic solvent, and the binder. The present invention also provides a negative electrode mixture including a negative electrode active material, an organic solvent, and the binder. Here, the positive electrode mixture and negative electrode mixture may be referred to collectively as an electrode mixture.

The positive electrode active material used in the present invention is not particularly limited as long as it can electrochemically occlude and release lithium ions. The positive electrode active material preferably contains lithium and at least one transition metal, and examples thereof include lithium transition metal complex oxides and lithium-containing transition metal phosphate compounds.

The transition metals in the lithium transition metal complex oxides are preferably V, Ti, Cr, Mn, Fe, Co, Ni, Cu, and the like. Specific examples of the lithium transition metal complex oxides include lithium/cobalt complex oxides such as $LiCoO_2$, lithium/nickel complex oxides such as $LiNiO_2$, lithium/manganese complex oxides such as $LiMnO_2$, $LiMn_2O_4$, and $Li_2MnO_3$, and those obtained by partially substituting the main transition metal atoms of these lithium transition metal complex oxides with other metals such as Al, Ti, V, Cr, Mn, Fe, Co, Li, Ni, Cu, Zn, Mg, Ga, Zr, and Si. Specific examples of the substituted compounds include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiMn_{1.8}Al_{0.2}O_4$, $LiMn_{1.5}Ni_{0.5}O_4$, and $Li_4Ti_5O_{12}$.

The transition metals in the lithium-containing transition metal phosphate compounds are preferably V, Ti, Cr, Mn, Fe, Co, Ni, Cu, and the like. Specific examples of the lithium-containing transition metal phosphate compounds include iron phosphates such as $LiFePO_4$, $Li_3Fe_2(PO_4)_3$, and $LiFeP_2O_7$, cobalt phosphates such as $LiCoPO_4$, and those obtained by substituting part of main transition metal atoms in these lithium transition metal phosphate compounds with other metals such as Al, Ti, V, Cr, Mn, Fe, Co, Li, Ni, Cu, Zn, Mg, Ga, Zr, Nb, and Si.

Especially, in terms of high voltage and high energy density or of charge/discharge characteristics, preferred are $LiCoO_2$, $LiNiO_2$, $LiMn_2O_4$, $LiNi_{0.82}Co_{0.15}Al_{0.03}O_2$, and $LiNi_{1/3}Co_{1/3}Mn_{1/3}O_2$, and $LiFePO_4$.

These positive electrode active materials used may have a surface to which a substance having a composition different from that of the main positive electrode active materials adheres. Examples of the substance adhering to the surface include oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; and carbonates such as lithium carbonate, calcium carbonate, and magnesium carbonate.

The substances may adhere to the surface of the positive electrode active materials, for example, by a method in which the substance is dissolved or suspended in a solvent and the positive electrode active material is impregnated therewith and then dried, a method in which a precursor of the substance is dissolved or suspended in a solvent and the positive electrode active material impregnated therewith is then reacted by heating or the like, or a method in which the substance is added to a precursor of the positive electrode active material and firing is performed at the same time.

In terms of the amount of the substance adhering to the surface, the lower limit is preferably at least 0.1 ppm, more preferably at least 1 ppm, and still more preferably at least 10 ppm, and the upper limit is preferably at most 20%, more preferably at most 10%, and still more preferably at most 5%, in mass relative to the mass of the positive electrode active material. The substances adhering to the surface can suppress oxidation of a nonaqueous electrolyte on the surface of the positive electrode active material to improve the cell life. If the amount thereof is too small, such an effect cannot be exerted sufficiently. If the amount thereof is too large, the transport of lithium ions is disturbed, which may increase the resistance.

The positive electrode active material particles may have a conventional shape such as block, polyhedron, sphere, elliptical sphere, plate, needle, and pillar shapes. Particularly preferably, primary particles of the positive electrode active material agglomerate to form secondary particles, and the secondary particles have a sphere or elliptical sphere shape. Along with charge and discharge of electrochemical elements, active materials in electrodes are commonly expanded and contracted, which easily cause deteriorations such as damage to the active material and disconnection of the conductive path due to the stress of the expansion and contraction. The stress of the expansion and contraction is more released in a case where primary particles of the active material agglomerate to form secondary particles, compared to a case where the active material is in the form of monoparticles including only primary particles. In such a case, deteriorations are favorably avoided. Spherical or elliptical spherical particles are less oriented in formation of electrodes than axis-orientational particles such as plate-like particles, and therefore are preferable because electrodes are less expanded and contracted upon charge and discharge and such particles are easily mixed with conductive agents uniformly in formation of electrodes.

The positive electrode active material has a tap density of commonly at least 1.3 g/cm³, preferably at least 1.5 g/cm³, still more preferably at least 1.6 g/cm³, and most preferably at least 1.7 g/cm³. If the tap density of the positive electrode active material is below the lower limit, the required amount of a dispersion medium in formation of a positive electrode active material layer may increase and the required amounts of a conductive material and of a binder may increase. In such a case, the filling rate of the positive electrode active material in the positive electrode active material layer is limited, possibly resulting in limitation of the cell capacity. The use of metal complex oxide particles having a high tap density allows formation of a dense positive electrode active material layer. A larger tap density is commonly preferable, and the upper limit is not particularly set. If the tap density is too large, however, dispersion of lithium ions with use of a non-aqueous electrolyte as a medium in the positive electrode active material layer is limited, possibly lowering the load characteristics. Accordingly, the tap density is commonly at most 2.5 g/cm³, and preferably at most 2.4 g/cm³.

The tap density of the positive electrode active material is determined as follows. The positive electrode active material is passed through a sieve with an aperture of 300 μm and drip into a 20-cm³ tapping cell to fill the cell. Using a powder density meter (e.g., Tap denser manufactured by Seishin Enterprise Co., Ltd.), tapping is performed 1000 times at a stroke length of 10 mm, and the density of the positive electrode active material is obtained as the tap density based on the volume and weight of the positive electrode active material during the tapping.

The positive electrode active material particles has a median size d50 (secondary particle size in a case where primary particles agglomerate to form secondary particles) of commonly at least 0.1 μm, preferably at least 0.5 μm, more preferably at least 1 μm, and most preferably at least 3 μm, and commonly at most 20 μm, preferably at most 18 μm, more preferably at most 16 μm, and most preferably at most 15 μm. If the median size is below the lower limit, the resulting product may not have a high bulk density. If the median size exceeds the upper limit, dispersion of lithium in the particles take a longer time, possibly lowering the cell characteristics or causing a problem such that streaks may be formed upon formation of positive electrodes of cells, namely, upon application of a composition prepared by slurrying the active material, conductive agent, binder, and the like with use of a solvent. The use of two or more kinds of positive electrode active materials having different median sizes d50 in combination can further improve the filling state upon formation of positive electrodes.

The median size d50 in the present invention is measured by a known laser diffraction/scattering grain size distribution measuring apparatus. In the case of using LA-920 (HORIBA, Ltd.) as a particle size distribution analyzer, the median size d50 is measured after ultrasonic dispersion for 5 minutes using a 0.1% by mass sodium hexamethaphosphate aqueous solution as a dispersion medium under the condition of the refractive index set to 1.24.

In a case where primary particles agglomerate to form secondary particles, the positive electrode active material has an average primary particle size of commonly at least 0.01

μm, preferably at least 0.05 μm, still more preferably at least 0.08 μm, and most preferably at least 0.1 μm, and commonly at most 3 μm, preferably at most 2 μm, still more preferably at most 1 μm, and most preferably at most 0.6 μm. If the average primary particle size exceeds the upper limit, spherical secondary particles are less likely to be formed to adversely affect the powder filling state or to significantly reduce the specific surface area. In such a case, cell characteristics such as output characteristics may be lowered. In contrast, if the average primary particle size is below the lower limit, crystals are commonly immature, possibly leading to a problem such that the reversibility of charge/discharge is poor. The primary particle size is measured by scanning electron microscopy (SEM). Specifically, in a picture at 10000-times magnification, the maximum section length of a primary particle in a horizontal direction was measured for arbitrary 50 primary particles, and the average of the measured values was determined as the primary particle size.

The positive electrode active material has a BET specific surface area of at least 0.2 m$^2$/g, preferably at least 0.3 m$^2$/g, and more preferably at least 0.4 m$^2$/g, and at most 4.0 m$^2$/g, preferably at most 2.5 m$^2$/g, and more preferably at most 1.5 m$^2$/g. If the BET specific surface area is below this range, the cell characteristics are likely to be lowered. If the BET specific surface exceeds this range, the tap density is less likely to increase, leading to defective applicability of the composition upon formation of the positive electrode active material.

The BET specific surface area is determined as follows. A sample preliminary dried under flow of nitrogen gas at 150° C. for 30 minutes is subjected to measurement using a surface area measurement equipment (e.g., fully automatic surface area measurement equipment manufactured by Okura Riken Co., Ltd.) by the nitrogen adsorption BET one-point method. The nitrogen adsorption BET one-point method is carried out by a flowing gas method using nitrogen/helium mixed gas accurately adjusted to make nitrogen have a relative pressure to the atmospheric pressure of 0.3. The measured value was determined as the BET specific surface area.

The positive electrode active material may be produced by a common method of producing an inorganic compound. Especially, various methods may be considered for producing spherical or elliptical spherical active materials. In one method, a transition metal source material such as nitrates and sulfates of transition metals and optionally a source material of another atom are dissolved or crushed and dispersed in a solvent such as water. The pH of the resulting fluid is adjusted with stirring to form spherical precursors. The recovered precursors are optionally dried, and a Li source such as LiOH, Li$_2$CO$_3$, and LiNO$_3$ was added thereto. The resulting precursors are fired at high temperatures to give an active material. In another method, a transition metal source material such as nitrates, sulfates, hydroxides, and oxides of transition metals and optionally a source material of another atom are dissolved or crushed and dispersed in a solvent such as water. The resulting fluid is dried and molded using a spray dryer or the like to form spherical or elliptical spherical precursors. A Li source such as LiOH, Li$_2$CO$_3$, and LiNO$_3$ are added to the precursors and the resulting precursors are fired at high temperatures to give an active material. In still another method, a transition metal source material such as nitrates, sulfates, hydroxides, and oxides of transition metals, a Li source such as LiOH, Li$_2$CO$_3$, and LiNO$_3$, and optionally a source material of another atom are dissolved or crushed and dispersed in a solvent such as water. The resulting fluid is dried and molded using a spray dryer or the like to form spherical or elliptical spherical precursors. The precursors are fired at high temperatures to give an active material.

In the present invention, one kind of positive electrode active material powder may be used solely, or two or more kinds of positive electrode active material powders having different compositions or different powder properties may be used together in any combination at any ratio.

The negative electrode active material is not particularly limited as long as it can electrochemically occlude and release lithium ions. Examples thereof include carbonaceous materials; metal oxides and composite metal oxides such as tin oxide and silicon oxide; lithium and lithium alloys such as lithium aluminum alloy; and metals alloyable with lithium, such as Sn and Si. Each of these may be used alone, or two or more of these may be used together in any combination at any ratio. In particular, carbonaceous materials or lithium complex oxides are favorably used in terms of safety.

The composite metal oxides are not particularly limited as long as they can occlude and release lithium, and preferably contains titanium and/or lithium as a component in terms of the high current density charge/discharge characteristics.

In terms of the balance between the initial irreversible capacity, and high current density charge/discharge characteristics, the carbonaceous material is preferably selected from the following materials (1) to (4):

(1) natural graphite;

(2) artificial carbonaceous materials and artificial graphite materials; carbonaceous materials resulting from at least one cycle of heating treatment at 400° C. to 3200° C. performed on carbonaceous substances {e.g., natural graphite, coal coke, petroleum coke, coal pitch, petroleum pitch, and oxides of the above pitches; needle coke, pitch coke, and partially graphitized carbon materials of the above cokes; pyrolysates of organic materials such as furnace black, acetylene black, and pitch carbon fiber; carbonizable organic materials (e.g., coal tar pitches from soft pitch to hard pitch; petroleum heavy oils such as retort oil; DC heavy oils such as atmospheric residue and vacuum residual oil; cracked petroleum heavy oils such as ethylene tar that is a byproduct generated in pyrolysis of crude oil, naphtha, and the like; aromatic hydrocarbons such as acenaphthylene, decacyclene, anthracene, and phenanthrene; N-cyclic compounds such as phenazine and acridine; S-cyclic compounds such as thiophene and bithiophene; polyphenylenes such as biphenyl and terphenyl; polyvinyl chloride, polyvinyl alcohol, polyvinyl butyral, and insolubilized materials of these; nitrogen-containing organic polymers such as polyacnilonitrile and polypyrrole; sulfur-containing organic polymers such as polythiophene and polystyrene; natural polymers such as polysaccharides typified by cellulose, lignin, mannan, polygalacturonic acid, chitosan, and saccharose; thermoplastic resins such as polyphenylene sulfide and polyphenylene oxide; thermosetting resins such as furfuryl alcohol resin, phenol-formaldehyde resin, and imide resin) and carbides of these; and solutions containing the carbonizable organic materials dissolved in low-molecular-weight organic solvents such as benzene, toluene, xylene, quinoline, and n-hexane, and carbides of these};

(3) carbonaceous materials in which the negative electrode active material layer contains at least two kinds of carbon materials having different crystallizability and/or has an interface where the carbon materials having different crystallizability are in contact; and (4) carbonaceous materials in which the negative electrode active material layer contains at least two kinds of carbon materials having different orientation characteristics and/or has an interface where the carbon materials having different orientation characteristics are in contact.

The amount of the positive electrode active material or negative electrode active material is preferably at least 40% by mass of the electrode mixture for the purpose of increasing the capacity of the resulting cell.

The positive electrode mixture and negative electrode mixture of the present invention may further contain conductive agents. Examples of the conductive agents include carbon fiber, carbon nanotube, carbon nanohorn, and carbon materials such as carbon blacks (e.g., acetylene black and Ketjenblack) and graphite.

The ratio of powder components (active material and conductive agent) and the fluoropolymer in the electrode mixture is commonly about 80:20 to 99.5:0.5 in weight. The ratio is determined in consideration of holding of the powder components, adhesiveness to the current collector, and conductivity of the electrodes.

With the compounding ratio as mentioned above, voids among powder components cannot be completely filled with the fluoropolymers in the electrode mixture layer formed on the current collector. The use of a solvent capable of well dissolving the fluoropolymers allows the fluoropolymers to be uniformly dispersed to form a net structure in the dried electrode mixture layer, which is preferable because the powder components are well held.

Examples of the organic solvent include nitrogen-containing organic solvents such as N-methyl-2-pyrrolidone, N,N-dimethylacetamide, and dimethylformamide; ketone solvents such as acetone, methyl ethyl ketone, cyclohexanone, and methyl isobutyl ketone; ester solvents such as ethyl acetate and butyl acetate; ether solvents such as tetrahydrofuran and dioxane; and general-purpose low-boiling organic solvents such as mixed solvents of the above-mentioned solvents.

In particular, the organic solvent is preferably N-methyl-2-pyrrolidone and/or N,N-dimethylacetamide because the resulting electrode mixture is excellent in stability and application properties.

The amount of the organic solvent in the electrode mixture is determined in consideration of the application properties to the current collector and film-formation properties after drying. Commonly, the ratio of the binder and organic solvent is preferably 5:95 to 20:80 in weight.

For the purpose of prompt dissolution in the organic solvent, the fluoropolymer used preferably has an average particle size of at most 1000 µm, especially within a small particle size range of 50 to 350 µm.

The electrode mixture may further contain acrylic resins such as polymethacrylate and polymethylmethacrylate, and polyimide, polyamide, and polyamideimide resins for the purpose of further improving the adhesiveness to the current collector.

In a case where the binder of the present invention is used as a binder in the positive electrode mixture and/or negative electrode mixture, the amount thereof is 0.1 to 20% by mass, and preferably 1 to 10% by mass in the electrode mixture.

A common method of preparing an electrode mixture containing the binder is dispersing and mixing an electrode material such as an electrode active material in a solution containing the binder dissolved in the organic solvent. The resulting electrode mixture is uniformly applied to a current collector such as a metal foil or metal mesh, and then dried and optionally pressed to form a thin electrode mixture layer on the current collector, thereby forming a thin film electrode.

In another method, the mixture may be prepared by mixing the binder powder and the electrode active material powder in advance and then adding an organic solvent thereto. In still another method, the binder powder and the electrode active material powder may be heated to be molten, and extruded by an extruder to prepare a mixture in a thin film form. Then, the film-like mixture may be attached to a current collector on which a conductive adhesive and a general-purpose organic solvent are applied, thereby producing an electrode sheet. Moreover, a binder solution may be applied to a preformed electrode active material. As mentioned above, the application method of the binder is not particularly limited.

The present invention also provides a positive electrode including a positive electrode current collector and a positive electrode active material layer formed of a positive electrode active material and the binder on the positive electrode current collector. The present invention further provides a negative electrode including a negative electrode current collector and a negative electrode active material layer formed of a negative electrode active material and the binder on the negative electrode current collector.

The positive electrode current collector and negative electrode current collector may be a metal foil or metal mesh made of iron, stainless steel, copper, aluminum, nickel, titanium or the like. In particular, the positive electrode current collector is preferably an aluminum foil or the like, and the negative electrode current collector is preferably a copper foil or the like.

The positive electrode and negative electrode of the present invention can be produced by the method described above, for example.

The present invention also provides a lithium ion secondary cell including the positive electrode of the present invention, a negative electrode, and a nonaqueous electrolyte. The present invention also provides a lithium ion secondary cell including a positive electrode, the negative electrode of the present invention, and a nonaqueous electrolyte.

The lithium ion secondary cell of the present invention includes a positive electrode that is the positive electrode of the present invention, or a negative electrode that is the negative electrode of the present invention. The lithium ion secondary cell of the present invention may include a positive electrode and a negative electrode that are respectively the positive electrode and negative electrode of the present invention.

The nonaqueous electrolyte is not particularly limited, and the organic solvent may be one or two or more of known hydrocarbon solvents such as propylene carbonate, ethylene carbonate, butylene carbonate, γ-butyl lactone, 1,2-dimethoxyethane, 1,2-diethoxyethane, dimethyl carbonate, and diethyl carbonate; and fluorine solvents such as fluoroethylene carbonate, fluoroether, and fluorinated carbonate. The electrolyte may be any conventionally known electrolyte, and examples thereof include $LiClO_4$, $LiAsF_6$, $LiPF_6$, $LiBF_4$, LiCl, LiBr, $CH_3SO_3Li$, $CF_3SO_3Li$, and cesium carbonate. The positive electrode mixture and/or negative electrode mixture of the present invention may further contain, for example, acrylic resins such as polymethacrylate and polymethylmethacrylate, polyimide, polyamide, and polyamideimide resins for the purpose of further improving the adhesiveness to the current collector.

Moreover, a separator may be provided between the positive electrode and negative electrode. The separator may be a conventionally known separator.

The binder of the present invention is usable as a binder for a nonaqueous electrolyte secondary cell not only for lithium ion secondary cells containing a liquid electrolyte as mentioned above but also for polymer electrolyte lithium secondary cells containing a polymer electrolyte that holds an electrolysis solution and electrolyte and also functions as a separator (i.e., polymer gel electrolyte). In addition, the binder of the present invention is also usable as a binder for electrical double layer capacitors.

Advantageous Effects of Invention

The binder of the present invention has the above structure and is excellent in adhesiveness to a base material such as metals. The binder is significantly suitable for electrode mixtures for nonaqueous electrolyte secondary cells such as lithium ion secondary cells.

DESCRIPTION OF EMBODIMENTS

The present invention is more specifically described based on examples. The present invention is not limited to these examples.

Example 1

Production of Fluoropolymer A

A 4-L autoclave was charged with 1.1 kg of pure water and subjected to sufficient nitrogen substitution, followed by addition of 880 g of octafluorocyclobutane. The system was maintained at 45° C. with stirring at 580 rpm. Next, 45 g of tetrafluoroethylene (TFE), 130 g of 1,1-difluoroethylene (vinylidene fluoride, VdF), and 2 g of a 10% by mass solution of N-t-butyl acrylamide (TBAA) in methanol were added thereto, and then 1 g of a 50% by mass solution of di-n-propyl peroxydicarbonate in methanol was added to initiate polymerization. Along with the progress of the polymerization, the system pressure is lowered. To avoid this, a mixed gas (tetrafluoroethylene/1,1-difluoroethylene=33/67 (mol %)) was continuously added to maintain the system pressure at 1.5 MPaG. A 10% by mass solution of N-t-butyl acrylamide in methanol in the total amount of 3.1 g was also continuously added and stirring was continued for 5 hours. Then, the pressure inside the autoclave was discharged to the atmospheric pressure. The reaction product was washed and dried to give 50 g of a fluoropolymer A in the form of white powder.

The obtained fluoropolymer A had the following composition and properties.
VdF/TFE/TBAA=66.4/33.4/0.2 (mol %)
5 wt % NMP solution viscosity: 493 mPa·s (25° C.)
Weight average molecular weight: 610000

Example 2

Production of Fluoropolymer B

A 6-L autoclave was charged with 1.8 kg of pure water and subjected to sufficient nitrogen substitution, followed by addition of 1.8 kg of octafluorocyclobutane. The system was maintained at 37° C. with stirring at 580 rpm. Next, 82 g of tetrafluoroethylene, 224 g of 1,1-difluoroethylene, and 5.7 g of a 10% by mass solution of N-t-butyl acrylamide in methanol were added thereto, and then 1.7 g of a 50% by mass solution of di-n-propyl peroxydicarbonate in methanol was added to initiate polymerization. Along with the progress of the polymerization, the system pressure is lowered. To avoid this, a mixed gas (tetrafluoroethylene/1,1-difluoroethylene=33/67 (mol %)) was continuously added to maintain the system pressure at 1.28 MPaG. A 10% by mass solution of N-t-butyl acrylamide in methanol in the total amount of 42.9 g was also continuously added and stirring was continued for 6 hours. Then, the pressure inside the autoclave was discharged to the atmospheric pressure. The reaction product was washed and dried to give 210 g of a fluoropolymer B in the form of white powder.

The obtained fluoropolymer B had the following composition and properties.
VdF/TFE/TBAA=66.3/33.2/0.5 (mol %)
5 wt % NMP solution viscosity: 338 mPa·s (25° C.)
Weight average molecular weight: 630000

Example 3

Production of Fluoropolymer C

Polymerization was performed under the same conditions as in Example 2, except that the amount of the 10% by mass solution of N-t-butyl acrylamide in methanol for initial addition was changed to 3.8 g and the total amount of the 10% by mass solution of N-t-butyl acrylamide in methanol for continuous addition was changed to 21.5 g, thereby producing a fluoropolymer C.

The obtained fluoropolymer C had the following composition and properties.
VdF/TFE/TBAA=66.4/33.3/0.3 (mol %)
5 wt % NMP solution viscosity: 1021 mPa·s (25° C.)
Weight average molecular weight: 900000

Example 7

Production of Fluoropolymer D

A 6-L autoclave was charged with 1.8 kg of pure water and subjected to sufficient nitrogen substitution, followed by addition of 1.8 kg of octafluorocyclobutane. The system was maintained at 37° C. with stirring at 580 rpm. Next, 82 g of tetrafluoroethylene, 224 g of 1,1-difluoroethylene, 2.29 g of a 10% by mass solution of N-vinyl acetamide (NVAA) in methanol were added thereto, and then 1.7 g of a 50% by mass solution of di-n-propyl peroxydicarbonate in methanol was added to initiate polymerization. Along with the progress of the polymerization, the system pressure is lowered. To avoid this, a mixed gas (tetrafluoroethylene/1,1-difluoroethylene=33/67 (mol %)) was continuously added to maintain the system pressure at 1.28 MPaG. A 10% by mass solution of N-vinyl acetamide in methanol in the total amount of 45.0 g was also continuously added and stirring was continued for 12 hours. Then, the pressure inside the autoclave was discharged to the atmospheric pressure. The reaction product was washed and dried to give 200 g of a fluoropolymer D in the form of white powder.

The obtained fluoropolymer D had the following composition and properties.
VdF/TFE/NVAA=66.8/32.9/0.3 (mol %)
5 wt % NMP solution viscosity: 121 mPa·s (25° C.)
Weight average molecular weight: 280000

Example 9

Production of Fluoropolymer I

A 6-L autoclave was charged with 1.9 kg of pure water and subjected to sufficient nitrogen substitution, followed by addition of 1.8 kg of octafluorocyclobutane. The system was maintained at 37° C. with stirring at 580 rpm. Next, 260 g of a mixed gas (tetrafluoroethylene/1,1-difluoroethylene=5/95 (mol %)), 0.6 g of ethyl acetate, and 5.7 g of a 10% by mass solution of N-t-butyl acrylamide (TBAA) in methanol were added thereto, and then 3.0 g of a 50% by mass solution of di-n-propyl peroxydicarbonate in methanol was added to initiate polymerization.

Along with the progress of the polymerization, the system pressure is lowered. To avoid this, a mixed gas (tetrafluoroethylene/1,1-difluoroethylene=15/85 (mol %)) was continuously added to maintain the system pressure at 1.3 MPaG. A 10% by mass solution of N-t-butyl acrylamide in methanol in the total amount of 180 g was also continuously added and stirring was continued for 36 hours.

Then, the pressure inside the autoclave was discharged to the atmospheric pressure. The reaction product was washed and dried to give 900 g of a fluoropolymer I in the form of white powder.

The obtained fluoropolymer I had the following composition and properties.
VdF/TFE/TBAA=83.4/16.3/0.3 (mol %)
5 wt % NMP solution viscosity: 400 mPa·s (25° C.)
Weight average molecular weight: 830000

Example 10

Production of Fluoropolymer J

A 6-L autoclave was charged with 1.9 kg of pure water and subjected to sufficient nitrogen substitution, followed by addition of 1.8 kg of octafluorocyclobutane. The system was maintained at 37° C. with stirring at 580 rpm.

Next, 260 g of a mixed gas (tetrafluoroethylene/1,1-difluoroethylene=5/95 (mol %)), 0.6 g of ethyl acetate, 5.7 g of a 10% by mass solution of N-t-butyl acrylamide (TBAA) in methanol were added, and then 2.6 g of a 50% by mass solution of di-n-propyl peroxydicarbonate in methanol was added to initiate polymerization. Along with the progress of the polymerization, the system pressure is lowered. To avoid this, a mixed gas (tetrafluoroethylene/1,1-difluoroethylene=15/85 (mol %)) was continuously added to maintain the system pressure at 1.3 MPaG. A 10% by mass solution of N-t-butyl acrylamide in methanol in the total amount of 180 g was also continuously added, and stirring was continued for 26 hours. Then, the pressure inside the autoclave was discharged to the atmospheric pressure. The reaction product was washed and dried to give 900 g of a fluoropolymer J in the form of white powder. The obtained fluoropolymer J had the following composition and properties.
VdF/TFE/TBAA=83.0/16.7/0.3 (mol %)
5 wt % NMP solution viscosity: 600 mPa·s (25° C.)
Weight average molecular weight: 1150000

Comparative Example 1

Production of Fluoropolymer Z

A 4-L autoclave was charged with 1.3 kg of pure water and subjected to sufficient nitrogen substitution, followed by addition of 1.3 kg of octafluorocyclobutane. The system was maintained at 37° C. with stirring at 580 rpm. Next, 55 g of tetrafluoroethylene and 145 g of 1,1-difluoroethylene were added, and then 1 g of a 50% by mass solution of di-n-propyl peroxydicarbonate in methanol was added to initiate polymerization. Along with the progress of the polymerization, the system pressure is lowered. To avoid this, a mixed gas (tetrafluoroethylene/1,1-difluoroethylene=32/68 (mol %)) was continuously added to maintain the system pressure at 1.28 MPaG. The stirring was continued for 8 hours. Then, the pressure inside the autoclave was discharged to the atmospheric pressure. The reaction product was washed and dried to give 190 g of a fluoropolymer Z in the form of white powder.

The obtained fluoropolymer Z had the following composition and properties.
VdF/TFE=66.5/33.5 (mol %)
5 wt % NMP solution viscosity: 970 mPa·s (25° C.)
Weight average molecular weight: 780000

Comparative Example 2

Fluoropolymer Y

KF7200 (PVdF manufactured by KUREHA CORPORATION) was used.
Weight average molecular weight: 790000

Comparative Example 3

Fluoropolymer X

KF9200 (PVdF manufactured by KUREHA CORPORATION) was used.
Weight average molecular weight: 650000

Example 4

Production of Fluoropolymer E

A solution of fluoropolymer A in NMP and a solution of fluoropolymer Y in NMP were separately prepared. The solutions were blended in such a manner that the solid contents of the fluoropolymer A and fluoropolymer Y satisfied 50/50 in weight ratio, thereby producing a fluoropolymer E.

Example 5

Production of Fluoropolymer F

A solution of fluoropolymer A in NMP and a solution of fluoropolymer Y in NMP were separately prepared. The solutions were blended in such a manner that the solid contents of the fluoropolymer A and fluoropolymer Y satisfied 30/70 in weight ratio, thereby producing a fluoropolymer F.

Example 6

Production of Fluoropolymer G

A solution of fluoropolymer A in NMP and a solution of fluoropolymer X in NMP were separately prepared. The solutions were blended in such a manner that the solid contents of the fluoropolymer A and fluoropolymer X satisfied 30/70 in weight ratio, thereby producing a fluoropolymer G.

Example 8

Production of Fluoropolymer H

A solution of fluoropolymer A in NMP and a solution of fluoropolymer X in NMP were separately prepared. The solutions were blended in such a manner that the solid contents of the fluoropolymer A and fluoropolymer X satisfied 20/80 in weight ratio, thereby producing a fluoropolymer H.

Example 11

Production of Fluoropolymer K

A solution of fluoropolymer I in NMP and a solution of fluoropolymer Y in NMP were separately prepared. The solutions were blended in such a manner that the solid contents of the fluoropolymer I and fluoropolymer Y satisfied 20/80 in weight ratio, thereby producing a fluoropolymer K.

Example 12

Production of Fluoropolymer L

A solution of fluoropolymer J in NMP and a solution of fluoropolymer Y in NMP were separately prepared. The solutions were blended in such a manner that the solid contents of the fluoropolymer J and fluoropolymer Y satisfied 20/80 in weight ratio, thereby producing a fluoropolymer L.

Physical properties of the fluoropolymers were measured and evaluated as follows.
(Polymer Composition)

The $^{19}$F-NMR measurement was performed on a solution of each polymer in DMSO using a NMR analyzer (Agilent Technologies, VNS400 MHz).

In the $^{19}$F-NMR measurement, the following peak areas (A, B, C, D) were obtained and proportions of VdF and TFE were calculated.

A: Peak area in a range of −86 ppm to −98 ppm
B: Peak area in a range of −105 ppm to −118 ppm
C: Peak area in a range of −119 ppm to −122 ppm
D: Peak area in a range of −122 ppm to −126 ppm Proportion of VdF: (4A+2B)/(4A+3B+2C+2D)×100 (mol %)

Proportion of TFE: (B+2C+2D)/(4A+3B+2C+2D)×100 (mol %) (Weight average molecular weight)

The weight average molecular weight was measured by gel permeation chromatography (GPC). The measurement was performed using AS-8010, CO-8020, columns (three GMHHR-H columns were connected in series)(all manufactured by TOSOH CORPORATION), and RID-10A (manufactured by Shimadzu Corporation). In the measurement, dimethylformamide (DMF) as a solvent was flowed at a rate of 1.0 ml/min. The weight average molecular weight was calculated based on the measured data (reference: polystyrene).
(Solution Viscosity)

A 5% by mass solution of fluoropolymer in N-methyl-2-pyrrolidone was prepared, and the viscosity thereof at 25° C. was measured using a B-type viscometer, TV-10M manufactured by TOKI SANGYO CO., LTD. Table 1 shows the results.
(Production of Fluoropolymer Cast Film)

The resulting fluoropolymer solution was cast coated on a PET film or aluminum foil. The applied solution was dried at 100° C. to 120° C. by a fan dryer or hot plate until NMP was completely evaporated, thereby forming a band-like polymer film.
(Measurement of Adhesion Between Fluoropolymer and Current Collector)

An end portion of a polymer film formed on an aluminum foil or copper foil was peeled from the aluminum foil or copper foil and a 180° peel test was performed using a Tensilon tester. The measurement was performed in conformity with ASTM D-638 (1999). The polymer films were categorized into two types based on the adhesion strength and peeling behavior. Tables 1 and 2 show the results.

Good: The polymer film is very strongly adhering so as to be cut before the polymer film was peeled from the aluminum foil or copper foil.

Poor: The polymer film is less adhering and easily peeled from the aluminum foil or copper foil.
(Measurement of the Modulus of Fluoropolymer)

An ASTM V dumbbell specimen was punched from a 2-mm-thick sheet prepared by melt processing of the fluoropolymer. The sample was pulled using a Tensilon tester for measurement of the tensile modulus. Table 1 shows the results.

A positive electrode was produced as follows using the fluorocopolymer and evaluated. Tables 1 and 2 show the results.
(Preparation of Slurry for Positive Electrode Mixture)

Target electrode materials were weighed such that the ratio thereof were set to LiCoO$_2$ (Nippon Chemical Industrial Co., Ltd.):fluorocopolymer:acetylene black (Nippon Graphite Industries, ltd.)=92:5:3 in mass. The fluorocopolymer was dissolved in N-methylpyrrolidone (NMP) to a concentration of 5% by mass. To the resulting solution of a binder in NMP were added, LiCoO$_2$ and acetylene black each in a predetermined amount. The resulting mixture was stirred using a stirrer (PRIMIX Corporation, T.K.HIVIS MIX) at 40 rpm for 30 minutes. NMP was added in an amount such that the solid concentration was set to 50% by mass. The mixture was stirred at 80 rpm for 30 minutes while being subjected to defoamation in vacuum, thereby preparing a slurry for a positive electrode mixture.
(Production of Positive Electrode)

The prepared slurry for a positive electrode mixture was passed through a Ni-mesh sieve (200-mesh) for uniformization of the particle size of solids contained therein. The slurry for a positive electrode mixture was then applied (in an amount with which a positive electrode coat film having a mass of 25 mg/cm$^2$ after drying is formed) to a 22-μm-thick Al foil (manufactured by TOYO ALUMINUM K.K.) as a current collector. The applied slurry was dried at 100° C. to 120° C. using an air fan constant temperature oven (manufactured by YAMATO SCIENTIFIC CO., LTD.) until NMP was completely evaporated, thereby producing a positive electrode.
(Measurement of Positive Electrode Density)

The positive electrode was passed through a roll press device with a gap of 75 μm between rolls at 70° C. twice, and then passed though the roll press device with a gap changed to 35 μm twice. The area, thickness, and weight of the positive electrode was measured and the density (g/cm$^3$) was calculated.
(Bending Test of Positive Electrode)

The produced positive electrode was cut into a specimen of 3 cm in length and 6 cm in width. The specimen was bent 180° and opened to check the presence of cracking in the positive electrode. With regard to the evaluation criteria, "Good" indicates that no cracking was observed and "Poor" indicates cracking was observed.
(Adhesiveness of Electrode (Peel Test of Positive Electrode))

The peel strength (N/m) of the interface between the positive electrode and aluminum foil was measured by the T-peel test.

TABLE 1

|  | Example 1 | Example 2 | Example 3 | Example 7 | Example 9 | Exampel 10 | Comparative Example 1 | Comparative Example 2 | Comparative Example 3 |
| --- | --- | --- | --- | --- | --- | --- | --- | --- | --- |
| Solution viscosity (mPa·s) | 493 | 338 | 1021 | 121 | 400 | 600 | 970 | 400 | 400 |
| Tensile modulus (MPa) | 400 | 400 | 400 | 400 | 400 | 400 | 400 | 1200 | 1200 |
| Adhesiveness (Al foil) | Good | Good | Good | Good | Good | Good | Poor | Poor | Good |
| Adhesiveness (Cu foil) | Good | Good | Good | Good | Good | Good | Poor | Poor | Good |
| Electrode density (g/cm$^3$) | 3.6 | 3.6 | 3.6 | 3.6 | 3.6 | 3.6 | 3.6 | 3.3 | 3.3 |
| Bending test of electrode | Good | Good | Good | Good | Good | Good | Good | Poor | Poor |
| Adhesiveness of electrode (N/m) | 11 | 15 | 15 | 10 | 15 | 15 | 5 | 5 | 10 |

Table 1 shows that the fluoropolymers produced in accordance with the present invention are excellent in adhesiveness to current collectors and have high flexibility. Since they have high flexibility, the use thereof as binders in production of electrodes easily improves the electrode density.

TABLE 2

|  | Example 4 | Example 5 | Example 6 | Example 8 | Example 11 | Example 12 |
| --- | --- | --- | --- | --- | --- | --- |
| Adhesiveness (Al foil) | Good | Good | Good | Good | Good | Good |
| Adhesiveness (Cu foil) | Good | Good | Good | Good | Good | Good |
| Electrode density (g/cm$^3$) | 3.6 | 3.5 | 3.5 | 3.5 | 3.5 | 3.5 |

Table 2 shows that the fluoropolymers produced in accordance with the present invention are, even blended with other polymers, excellent in adhesiveness to current collectors, and the use thereof easily improves the electrode density.

The invention claimed is:

1. A binder, comprising a fluoropolymer,
the fluoropolymer including a polymerization unit based on vinylidene fluoride, a polymerization unit based on tetrafluoroethylene, and a polymerization unit based on a monomer having an amide group represented by —CO—NRR' (R and R' are the same as or different from each other and each represent a hydrogen atom or an alkyl group optionally having a substituent group) or an amide bond represented by —CO—NR"— (R" represents a hydrogen atom, an alkyl group optionally having a substituent group, or a phenyl group optionally having a substituent group) and having a solution viscosity of 10 to 20,000 mPa·s,
wherein the fluoropolymer includes the polymerization unit based on vinylidene fluoride in an amount of 50 to 90 mol %, the polymerization unit based on tetrafluoroethylene in an amount of 9.9 to 49.9 mol %, and the polymerization unit based on a monomer having an amide group or an amide bond in an amount of 0.01 to 2 mol % relative to the amount of all the polymerization units.

2. The binder according to claim 1,
wherein the fluoropolymer includes a polymerization unit based on at least one monomer selected from the group consisting of vinyl fluoride, trifluoroethylene, trifluorochloroethylene, fluoroalkyl vinyl ether, hexafluoropropylene, 2,3,3,3-tetrafluoropropene, and propylene.

3. The binder according to claim 1,
wherein the fluoropolymer has a weight average molecular weight of 50000 to 2000000.

4. The binder according to claim 1, further comprising a vinylidene fluoride (VdF) polymer,
wherein the fluoropolymer and the VdF polymer have a mass ratio [(fluoropolymer)/(VdF polymer)] of 90/10 to 10/90.

5. The binder according to claim 4,
wherein the VdF polymer has a weight average molecular weight of 50000 to 2000000.

6. A positive electrode mixture comprising a positive electrode active material, an organic solvent, and the binder according to claim 1.

7. A negative electrode mixture comprising a negative electrode active material, an organic solvent, and the binder according to claim 1.

8. A positive electrode comprising a positive electrode current collector and a positive electrode active material layer formed of a positive electrode active material and the binder according to claim 1 on the positive electrode current collector.

9. A negative electrode comprising a negative electrode current collector and a negative electrode active material layer formed of a negative electrode active material and the binder according to claim 1 on the negative electrode current collector.

10. A lithium ion secondary cell comprising the positive electrode according to claim 8, a negative electrode, and a nonaqueous electrolyte.

11. A lithium ion secondary cell comprising a positive electrode, the negative electrode according to claim 9, and a nonaqueous electrolyte.

* * * * *